United States Patent Office 2,733,276
Patented Jan. 31, 1956

2,733,276

PRODUCTION OF BENZENE HEXACHLORIDE

Paul D. Bartlett, Weston, Mass., assignor, by mesne assignments, to Columbia-Southern Chemical Corporation, Pittsburgh, Pa., a corporation of Delaware No Drawing. Application August 8, 1952,
Serial No. 303,409

2 Claims. (Cl. 260—648)

This invention relates to a novel method of producing benzene hexachloride by addition chlorination of benzene.

It is known that chlorine may be reacted with benzene in the absence of a substitution catalyst under conditions which promote addition chlorination to prepare benzene hexachloride. In general, the processes described in the literature which have been proposed or used to chlorinate benzene and produce benzene hexachloride have employed actinic light, such as ultraviolet, to activate the reaction.

At least five isomeric forms of benzene hexachloride are produced by known addition chlorination processes. These isomers have been designated as alpha, beta, gamma, delta and epsilon isomers. For particular purposes, such as in the insecticidal field, it is conventionally recognized that a high gamma isomer content is desirable. Accordingly, one of the particular objectives has been to achieve high gamma isomer concentrations in the reaction product.

Gamma isomer contents consistently in excess of those produced by conventional processes may be attained by resort to specific reaction conditions. For example, gamma isomer contents consistently from 19 to 20 per cent by weight, and frequently from 24 to 28 per cent by weight, may be achieved by adding chlorine to a liquid reaction mixture of benzene and a partially halogenated hydrocarbon irradiated with actinic light while maintaining a substantial chlorine concentration not in excess of 1.5 per cent by weight of the benzene and partially halogenated hydrocarbon at a reaction temperature below the freezing point of benzene but at which the reaction mixture is liquid. These gamma isomer contents are considerably greater than the 12 to 16 per cent concentrations achieved by practice of the conventional processes described in the literature.

One of the critical reaction conditions in the aforedescribed high gamma photochlorination process is the chlorine concentration in the reaction mixture which must be above 0.005 per cent but not in excess of 1.5 per cent by weight of the benzene and partially halogenated hydrocarbon. Control of this chlorine concentration is provided by correlating the rate at which chlorine is added to the reaction mixture and the rate at which chlorine reacts with benzene. The rate of reaction for formation of benzene hexachloride is proportional to the intensity of the actinic irradiation. Thus, chlorine concentration control in such a process entails balancing the reaction rate with the activating influence of the irradiation.

The catalytic effect of actinic irradiation during the course of the reaction varies considerably. For example, it has been observed that the rate at which chlorine reacts with benzene to form benzene hexachloride continually diminishes as the reaction proceeds. Accordingly, unless the rate of chlorine introduction is decreased and/or the intensity of the actinic irradiation is increased, the concentration of chlorine in the reaction mixture builds up to a level which is outside of the range for optimum gamma isomer concentration in the aforedescribed method of preparing benzene hexachloride.

Expedients which may compensate for the decreasing efficiency of the irradiation are not altogether satisfactory. It is possible, for instance, to reduce the rate at which chlorine is added to the reaction mixture. This, of course, appreciably lengthens the reaction period per ton of product. More equipment per ton of product is therefore required. Increasing the intensity of the irradiation is also possible. However, to attain the desired high gamma isomer contents, reaction temperatures of from about 5° C. (freezing point of benzene) to as low as minus 100° C. are required. Maintaining these low temperatures when more intense irradiation is employed requires increased refrigeration. In large scale operations, the uniform removal of sufficient heat to maintain accurate temperature control requires specially designed equipment. Further increasing the refrigeration load, is therefore undesirable, and frequently a limiting factor in production.

According to this invention, a novel process is provided which is simple to perform and which does not require actinic light. It has been found that addition chlorination of benzene may be performed by carrying out the reaction in the presence of phenylacetyl peroxide. The use of this catalyst is of particular value in the aforedescribed low temperature process which requires accurate chlorine concentration control since its catalyzing effectiveness does not decrease as the reaction proceeds. Thus, practice of this invention circumvents the aforedescribed disadvantages of photochlorination processes.

This invention may be practiced by recourse to various procedures. For instance, chlorine may be added to a reaction mixture of benzene and a partially halogenated hydrocarbon, such as methylene chloride, containing a catalytic amount of phenylacetyl peroxide while maintaining the reaction temperature below 5° C. and above the freezing point of the reaction mixture and maintaining the chlorine concentration between 0.005 and 1.5 per cent by weight of the benzene and partially halogenated hydrocarbon. Once the chlorine addition rate has been balanced with the reaction rate and the chlorine concentration is established, the reaction will proceed at a relatively constant rate until essentially all of the benzene has been converted to the product.

It may be noted, for example, that phenylacetyl peroxide provides the benefits described hereinbefore in the process of preparing benzene hexachloride wherein chlorine is added to a reaction mixture of benzene and a solvent other than a partially halogenated solvent, at temperatures below the freezing point of benzene wherein the chlorine concentration is maintained between 0.005 and 2.0 per cent by weight of the benzene and solvent. Typical solvents include the fluorochloromethanes such as dichlorodifluoromethane, trichloromonofluoromethane, and higher fully fluorinated and chlorinated hydrocarbons containing only chlorine, fluorine and carbon atoms. Fully halogenated hydrocarbons including carbon tetrachloride, carbon tetrafluoride and the like which are liquid at the reaction temperature may also be employed. Other liquids such as liquid sulphur dioxide, liquid sulphuryl chloride, liquid phosgene, kerosene, thionyl chloride, proprionic anhydride and like liquids are also useful.

Phenylacetyl peroxide will catalyze the addition chlorination of benzene under conditions other than those previously described. It may be employed in lieu of actinic light, or other recognized catalysts, to promote this reaction, in any of the known benzene addition chlorination processes employed in the preparation of benzene hexachloride. However, as already explained, it provides particular advantages over catalysts such as actinic light when employed in processes requiring particularly low reaction temperatures and accurate control of chlorine concentrations in the reaction mixture.

It is emphasized, however, that not all organic peroxides are suitable in the practice of processes which require chlorination at temperatures below 5° C. At these low temperatures, most organic peroxides have little or no catalytic properties in addition chlorination of benzene. Thus, benzoyl peroxide, for example, is an ineffective catalyst at temperatures below 5° C. Accordingly, phenylacetyl peroxide also provides advantages over the use of peroxides such as benzoyl peroxide since it is capable of promoting addition chlorinations at temperatures below 5° C.

The amount of phenylacetyl peroxide which is required to catalyze this low temperature reaction is quite small. In fact, even traces will catalyze the reaction. For most purposes, from 0.1 to about 5 to 10 per cent by weight of phenylacetyl peroxide, based on the benzene and solvent, is suitable. Larger amounts do not appear objectionable. The most suitable amount of phenylacetyl peroxide is related to the rate of reaction and particular reaction temperature. At a given temperature, the rate of reaction may be increased by employing larger amounts of phenylacetyl peroxide. Similarly, if the reaction temperature is lowered, increased amounts of phenylacetyl peroxide are required to maintain the same reaction rate.

Suitable control of chlorine concentrations is achieved by balancing the catalytic effect of phenylacetyl peroxide with the rate of chlorine addition for each temperature. When higher addition rates are desired, an appropriately increased amount of phenylacetyl peroxide, which provides a reaction rate corresponding to the higher addition rate, is employed.

The partially halogenated hydrocarbons which are conducive to the production of high gamma isomer contents in this invention are those having from 1 to 4 carbon atoms. Particularly good results may be obtained by using partially chlorinated aliphatic hydrocarbons containing 1 or 2 carbon atoms, such as methylene chloride, methyl chloride, chloroform, methyl chloroform, and ethylene dichloride. However, other compounds, such as trichloroethane, tertiary butyl chloride, secondary butyl chloride, iso propyl chloride, isobutyl chloride, n-propyl chloride, 1,1,2,2,3-pentachloropropane, higher butane halides, etc., containing up to and including 4 carbon atoms, and analogous bromides, iodides or fluorides may be employed.

The amount of partially halogenated hydrocarbon which is employed with benzene may be varied from 5 or 10 to 99 per cent by weight of the benzene and partially halogenated hydrocarbon. In general, highest gamma isomer contents are attained when higher concentrations of the partially halogenated hydrocarbon are used, for example, when 30 to 95 per cent by weight of the hydrocarbon is employed.

Reaction temperatures below 5° C. and above the freezing point of the reaction mixture may normally be employed. Preferably, the reaction is carried out between 5° C. and minus 15° C. or even lower temperatures. Lower temperatures have certain advantages, such as high gamma contents, but require larger amounts of catalyst and added refrigeration. Thus, in practice, these factors are balanced in selecting the actual operating temperature.

As has been previously pointed out, the chlorine concentration must be maintained between 0.005 and 1.5 per cent by weight of the benzene and solvent. The optimum chlorine concentration within this range varies with the reaction temperature, the partially halogenated hydrocarbon used, and the relative proportions of benzene and partially halogenated hydrocarbon present in the reaction mixture.

It is preferable to exercise certain precautions in order to obtain best results in the practice of this invention. The presence of elemental oxygen in the reaction mixture is undesirable. It is therefore advantageous to flush the system with essentially pure nitrogen prior to and during the course of the reaction. Essentially pure reactants should be used. For example, benzene may be partially photochlorinated and then distilled with the ends discarded in order to remove impurities. Also, since phenylacetyl peroxide decomposes readily at room temperature, it should be freshly prepared or be stored at subzero temperatures, such as minus 10° C., prior to use. Of course, the presence of materials favoring substitution chlorination of benzene in the reaction system should be avoided.

Although the invention has been described with reference to the use of phenylacetyl peroxide per se, it may be practiced by employing phenylacetyl peroxide in conjunction with other known catalysts which are operable at temperatures below the freezing point of benzene. Thus, phenylacetyl peroxide in combination with actinic light, or gamma irradiation or other high frequency electromagnetic radiation, or peroxydicarbonate esters such as isopropyl peroxydicarbonate may be used.

The following example illustrates the practice of this invention:

EXAMPLE

The apparatus consisted of a U-shaped glass tube (similar to a Thiele melting point tube) having two vertical arms and a glass tubular member connecting the upper portion of each vertical arm of the U-shaped tube to create a circular continuous path within the apparatus. The vertical arms had openings at the top of the columns. Both vertical arms had outside diameters of approximately 6 centimeters. A rubber stopper closed the opening in one vertical arm. Near the top of this vertical arm an opening was provided leading to a dry ice condenser for condensing low boiling halogenated hydrocarbons, and the condenser was connected to suitable traps (not shown) for collecting any HCl driven off during the reaction. A thermometer was inserted in this arm through the stopper to measure the temperature of the reaction mixture. A high speed propeller, driven by a suitable motor, was inserted into the other vertical arm through the opening in the top thereof. Introduction of chlorine and nitrogen was provided near the top of this vertical arm, and an outlet for removal of the product was provided near the bottom of this vertical arm.

The entire apparatus was shielded from light by a light impermeable coating. The lower portion of the circulatory apparatus was placed in a container containing a dry ice-acetone mixture suitable for cooling of the reaction mixture.

Prior to the reactions, benzene and methylene chloride were specially purified. The benzene was partially photochlorinated to remove small amounts of easily chlorinatable impurities and then distilled, while the methylene chloride was distilled through a 15-plate column to remove any inhibitory materials.

A solution of 335 milliliters of methylene chloride and 200 milliliters of benzene was placed in the reactor. Circulation and cooling was then started and when the temperature fell below the reaction temperature of the run, the phenylacetyl peroxide was added to the charge in the amounts indicated in Table I. The apparatus was flushed with nitrogen for 30 to 60 minutes.

Gaseous chlorine at the rate indicated in Table I and nitrogen (at the rate of 0.05 to 0.1 mole per hour) were mixed and passed into the reaction flask.

During the reaction, the chlorine concentrations were generally determined at 30 minute intervals. This was done by transferring 1 to 4 grams of the mixture into a tared flask containing potassium iodide solution. The weight of the sample was thus obtained, and the liberated iodine was titrated with 0.01 to 0.1 N sodium thiosulfate. The concentration of chlorine was calculated to find per cent by weight of chlorine present in the sample for all experiments.

The following table summarizes the reaction conditions and results:

Table I

| Run | Temperature, °C. | Phenyl Acetyl Peroxide, Percent by weight of solution | Chlorine Addition, Grams per Minute | Chlorine Concentration, Percent | | Yield,[1] percent | Percent Gamma Isomer in Product |
| --- | --- | --- | --- | --- | --- | --- | --- |
| | | | | Range | Average | | |
| 1 | 0 | 0.35 | 0.3 | 0.13–0.31 | 0.2 | 88 | 19.5 |
| 2 | 0 | 0.44 | 1.2 | 0.24–0.33 | 0.3 | 91 | 20.0 |
| 3 | 0 | 0.1 | 0.66 | 0.64–0.98 | 0.8 | 93 | 19.3 |
| 4 | −15 | 1.15 | 0.3 | 0.81–0.36 | 0.54 | 97 | 21.3 |

[1] Based on amount of chlorine added.

The following chlorine concentrations were observed during the course of the above experiments:

Table II

| Time, Minutes | Chlorine Concentration, Percent | | | |
| --- | --- | --- | --- | --- |
| | Run 1 | Run 2 | Run 3 | Run 4 |
| 0 | | | | |
| 30 | | 0.24 | 0.64 | 0.81 |
| 60 | 0.13 | 0.31 | 0.76 | 0.65 |
| 90 | | 0.33 | 0.98 | 0.54 |
| 120 | 0.20 | | | 0.45 |
| 180 | 0.31 | | | 0.42 |
| 240 | | | | 0.36 |

Although the present invention has been described with reference to the specific details of certain embodiments thereof, it is not intended that such details shall be regarded as limitations upon the scope of the invention except insofar as included in the accompanying claims.

What is claimed:
1. In a process of preparing benzene hexachloride by addition chlorination of benzene at a temperature below the freezing point of benzene, the improvement which comprises carrying out the reaction in the presence of phenylacetyl peroxide.

2. In a method of preparing benzene hexachloride by adding chlorine to a mixture containing benzene wherein the chlorine concentration in the mixture is maintained between 0.005 and 2.0 per cent by weight of said mixture and the mixture is at a temperature below the freezing point of benzene, the improvement which comprises carrying out the reaction of the presence of phenylacetyl peroxide.

References Cited in the file of this patent

UNITED STATES PATENTS

| 2,300,566 | Hahn et al | Nov. 3, 1942 |
| 2,628,260 | Britton et al. | Feb. 10, 1953 |
| 2,692,900 | Bissinger | Oct. 26, 1954 |